(12) United States Patent
Inoue et al.

(10) Patent No.: US 8,232,764 B2
(45) Date of Patent: *Jul. 31, 2012

(54) POWER RECEIVING DEVICE, AND ELECTRONIC APPARATUS AND NON-CONTACT CHARGING SYSTEM USING THE SAME

(75) Inventors: Tetsuo Inoue, Yokohama (JP); Takao Kusaka, Yokohama (JP)

(73) Assignees: Kabushiki Kaisha Toshiba, Tokyo (JP); Toshiba Materials Co., Ltd., Yokohama-shi (JP)

( * ) Notice: Subject to any disclaimer, the term of this patent is extended or adjusted under 35 U.S.C. 154(b) by 581 days.

This patent is subject to a terminal disclaimer.

(21) Appl. No.: 12/294,401

(22) PCT Filed: Mar. 22, 2007

(86) PCT No.: PCT/JP2007/000279
§ 371 (c)(1),
(2), (4) Date: Sep. 24, 2008

(87) PCT Pub. No.: WO2007/111019
PCT Pub. Date: Oct. 4, 2007

(65) Prior Publication Data
US 2009/0121677 A1    May 14, 2009

(30) Foreign Application Priority Data
Mar. 24, 2006  (JP) .................. 2006-082389

(51) Int. Cl.
*H02J 7/00* (2006.01)
(52) U.S. Cl. ........................... 320/108; 307/104
(58) Field of Classification Search .................. 320/108
See application file for complete search history.

(56) References Cited

U.S. PATENT DOCUMENTS

| 5,479,083 | A | 12/1995 | Brainard |
| 5,600,225 | A | 2/1997 | Goto |
| 5,656,983 | A | 8/1997 | Ito et al. |
| 5,719,546 | A | 2/1998 | Ito et al. |
| 6,324,431 | B1 | 11/2001 | Zarinetchi et al. |
| 6,432,377 | B1 | 8/2002 | Hayashi et al. |
| 6,593,841 | B1 | 7/2003 | Mizoguchi et al. |
| 6,657,351 | B2 | 12/2003 | Chen et al. |

(Continued)

FOREIGN PATENT DOCUMENTS
JP    52-153035 U    11/1977
(Continued)

OTHER PUBLICATIONS
Machine Translation for JP11176677.*
(Continued)

*Primary Examiner* — Ramy Ramadan
(74) *Attorney, Agent, or Firm* — Foley & Lardner LLP

(57) ABSTRACT

An electronic apparatus (1) includes a power receiving device (2) and an electronic apparatus main body (3). The power receiving device (2) includes a power receiving coil (11) having a spiral coil, a rectifier (12), and a secondary battery (13). The electronic apparatus main body (3) includes an electronic device (14) and a circuit board (15). A magnetic foil (16) is arranged in at least one position between the spiral coil (11) and the secondary battery (13), the rectifier (12), the electronic device (14), or the circuit board (15). The magnetic foil (16) has a μr'·t value expressed as the product of the real component μr' of relative permeability and the plate thickness t of 30000 or larger.

17 Claims, 8 Drawing Sheets

U.S. PATENT DOCUMENTS

| | | | |
|---|---|---|---|
| 6,683,438 B2 * | 1/2004 | Park et al. | 320/108 |
| 6,962,833 B2 * | 11/2005 | Tuttle et al. | 438/55 |
| 7,042,196 B2 * | 5/2006 | Ka-Lai et al. | 320/108 |
| 7,164,255 B2 * | 1/2007 | Hui | 320/108 |
| 7,525,283 B2 * | 4/2009 | Cheng et al. | 320/108 |
| 2005/0189910 A1 * | 9/2005 | Hui | 320/108 |
| 2006/0061323 A1 * | 3/2006 | Cheng et al. | 320/108 |

FOREIGN PATENT DOCUMENTS

| | | |
|---|---|---|
| JP | 58-080753 U | 6/1983 |
| JP | 04-122007 A | 4/1992 |
| JP | 06-163273 A | 6/1994 |
| JP | 07-231586 A | 8/1995 |
| JP | 08-079976 A | 3/1996 |
| JP | 08-148360 A | 6/1996 |
| JP | 08-264351 A | 10/1996 |
| JP | 09-190938 A | 7/1997 |
| JP | 11-176677 A | 7/1999 |
| JP | 11-265814 A | 9/1999 |
| JP | 11-345724 A | 12/1999 |
| JP | 2000-023393 A | 1/2000 |
| JP | 2000-091113 A | 3/2000 |
| JP | 2001-090031 A | 4/2001 |
| JP | 2003-257751 A | 9/2003 |

OTHER PUBLICATIONS

U.S. Appl. No. 12/294,399, filed Sep. 24, 2008, Inoue et al.
T. Inoue, U.S. PTO Office Action, U.S. Appl. No. 12/294,399, dated Apr. 15, 2011, 16 pages.
T. Inoue, U.S. PTO Office Action, U.S. Appl. No. 12/294,399, dated Sep. 28, 2011, 17 pages.
T. Inoue, U.S. PTO Notice of Allowance, U.S. Appl. No. 12/294,399, dated Feb. 13, 2012, 10 pages.

* cited by examiner

POWER RECEIVING DEVICE, AND ELECTRONIC APPARATUS AND NON-CONTACT CHARGING SYSTEM USING THE SAME

TECHNICAL FIELD

The present invention relates to a power receiving device applied for non-contact charging, and an electronic apparatus and a non-contact charging system using the same.

BACKGROUND ART

In recent years, development of portable communication apparatuses is proceeding remarkably, and among others, downsizing and thickness reduction of mobile phones are in rapid progress. Other than mobile phones, downsizing and thickness reduction are in progress also for electronic apparatuses such as handy cameras (portable video cameras or the like), cordless telephones, laptop PCs (notebook sized PCs), and the like. Provided with a secondary battery mounted on an electronic apparatus main body, they are structured to be usable without plugging to an outlet, thereby increasing portability and convenience. However, the secondary battery has a limit in capacity and needs to be charged once every few days or every few weeks.

As charging methods, there are contact charging method and non-contact charging method. The contact charging method is a method to perform charging while the electrodes of a power receiving device and electrodes of a power feeding device are contacted with each other directly. The contact charging method is used in general because of its simple device structure. However, electronic apparatuses are becoming lighter in weight along with the downsizing and thickness reduction of electronic apparatuses in recent years, and thereby a problem arises such that the contact pressure between electrodes of the power receiving device and electrodes of the power feeding device becomes insufficient, thereby causing charging failure. The secondary battery is vulnerable to heat, and hence a circuit thereof should be designed to avoid over discharging and overcharging for preventing increase in temperature of the battery.

From this point, application of the non-contact charging method is considered. Conventional non-contact charging methods mainly use a nickel-hydrogen battery as the secondary battery, and hence have a problem that many of them take charging time of about eight hours. In this point, by emergence of high capacity secondary batteries such as Li-ion secondary batteries, application of non-contact charging methods is considered also for electronic apparatuses which consume relatively large power and require rapid charging, such as mobile phones and notebook sized PCs.

The non-contact charging method is a method such that a coil is provided in both the power receiving device and the power feeding device, and charging is performed using electromagnetic induction. Since the non-contact charging method does not require considering the contact pressure between electrodes, it is possible to supply a charging voltage stably without being affected by contact states of electrodes with each other. As a coil for a non-contact charging system, there is known a structure that a coil is wound around a ferrite core (refer to References 1, 2). There is also known a structure such that a coil is mounted on a resin substrate in which ferrite powder or amorphous powder are mixed (refer to Reference 3). However, the ferrite becomes fragile when processed to be thin, and hence is poor in shock resistance. A problem can easily occur in the power receiving device due to dropping of the device or the like.

For making the power receiving portion thinner corresponding to thickness reduction of an apparatus, there is adopted a flat coil formed by printing a metal powder paste in a spiral shape on a substrate. Further, structures are proposed in which the coupling between a flat coil (primary coil) on the power transmission side and a flat coil (secondary coil) on the power receiving side is intensified by a magnetic body (refer to Reference 4 to 6). The magnetic body (magnetic sheet) is used as a core material for intensifying the coupling between the primary coil and the secondary coil. However, as the transmission rate becomes higher, there arises a need for considering not only the coupling between the coils but heating of the surrounding parts.

Specifically, when the flat coil is used, magnetic flux passing through the flat coil is interlinked with a substrate or the like in the apparatus, and thus an overcurrent generated due to electromagnetic induction causes heating in the apparatus. Accordingly, large power cannot be transmitted, and a problem that the charging time becomes long arises. For example, when power transmission rate is raised ignoring the heating, carbon dioxide gas is generated in the Li-ion secondary battery, and there is concern that expansion and explosion or the like occurs. Accordingly, charging of a mobile phone by the non-contact charging system takes about 130% relative to the charging time by a contact charging device.

Li-ion secondary batteries used for mobile phones, digital cameras, portable game machines, portable audiovisual devices, and the like have five times or more charging capacity per unit time as compared to conventional nickel-hydrogen batteries. Therefore, when it is attempted to increase power transmission rate in the non-contact charging method, the problem of heating due to the overcurrent cannot be ignored. Thus, the power receiving devices to which conventional non-contact charging methods are applied have insufficient measures for the overcurrent generated by electromagnetic induction and heating based on this. The generation of overcurrent leads to generation of noise, and further becomes a factor to decrease charging efficiency.

[Reference 1] JP-A 11-265814 (KOKAI)
[Reference 2] JP-A 2000-023393 (KOKAI)
[Reference 3] JP-A 09-190938 (KOKAI)
[Reference 4] JP-U 58-080753 (Japanese Utility Model Publication)
[Reference 5] JP-A 04-122007 (KOKAI)
[Reference 6] JP-A 08-148360 (KOKAI)

DISCLOSURE OF THE INVENTION

An object of the present invention is to provide a power receiving device capable of suppressing an overcurrent generated on the power receiving side by electromagnetic induction, and thereby suppressing heating and decrease in power receiving efficiency due to the overcurrent, an electronic apparatus using the same, and a non-contact charging system.

A power receiving device according to an aspect of the present invention includes: a power receiving coil having a spiral coil; a rectifier rectifying an alternating voltage generated in the power receiving coil; a secondary battery to which a direct current voltage rectified in the rectifier is charged; and a magnetic foil arranged in at least one of a position between the spiral coil and the secondary battery, and a position between the spiral coil and the rectifier, in which when a real component of relative permeability of the magnetic foil is $\mu_r'$ and a plate thickness of the magnetic foil is t [μm], the magnetic foil has a value (μr'·t) expressed as the product of the real component μr' of the relative permeability and the plate thickness t of 30000 or larger.

An electronic apparatus according to an aspect of the present invention includes: a power receiving device including a power receiving coil having a spiral coil, a rectifier rectifying an alternating voltage generated in the power receiving coil, and a secondary battery to which a direct current voltage rectified in the rectifier is charged; an electronic apparatus main body including an electronic device supplied with the direct current voltage from the secondary battery for operation, and a circuit board on which the electronic device is mounted; and a magnetic foil arranged in at least one of a position between the spiral coil and the secondary battery, a position between the spiral coil and the rectifier, a position between the spiral coil and the electronic device, and a position between the spiral coil and the circuit board, in which when a real component of relative permeability of the magnetic foil is μr' and a plate thickness of the magnetic foil is t [μm], the magnetic foil has a value (μr'·t) expressed as the product of the real component μr' of the relative permeability and the plate thickness t of 30000 or larger.

A non-contact charging system according to an aspect of the present invention includes: the electronic apparatus according to an aspect of the present invention; and a power feeding device including a power feeding coil arranged in a non-contact manner with the power receiving coil of the electronic apparatus and a power supply applying an alternating voltage to the power feeding coil, in which magnetic flux generated in the power feeding coil is transmitted to the power receiving coil to transmit power in a non-contact manner.

EXPLANATION OF NUMERALS AND SYMBOLS

1 . . . electronic apparatus, 2 . . . power receiving device, 3 . . . electronic apparatus main body, 4 . . . housing, 11 . . . spiral coil (power receiving coil), 12 . . . rectifier, 13 . . . secondary battery, 14 . . . electronic device, 15 . . . circuit board, 16 . . . magnetic foil, 16a . . . bending portion, 16b . . . opening, 17 . . . slit, 20 . . . non-contact charging system, 30 . . . power feeding device, 31 . . . power feeding coil, 32 . . . magnetic core, 33 . . . power supply.

BEST MODE FOR CARRYING OUT THE INVENTION

Figure 1:
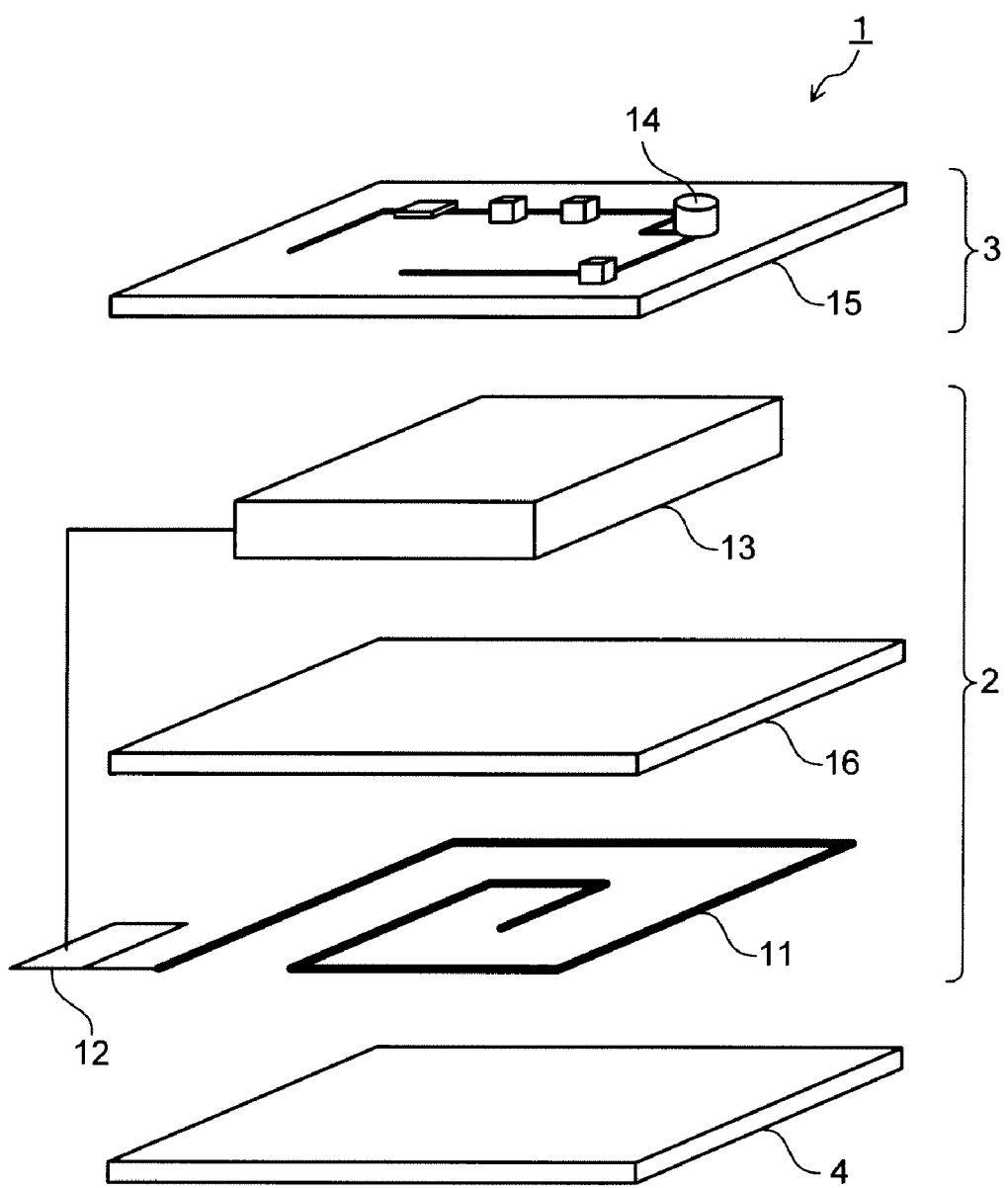
FIG. 1 is a view showing the structure of an electronic apparatus according to a first embodiment of the present invention.
Figure 2:
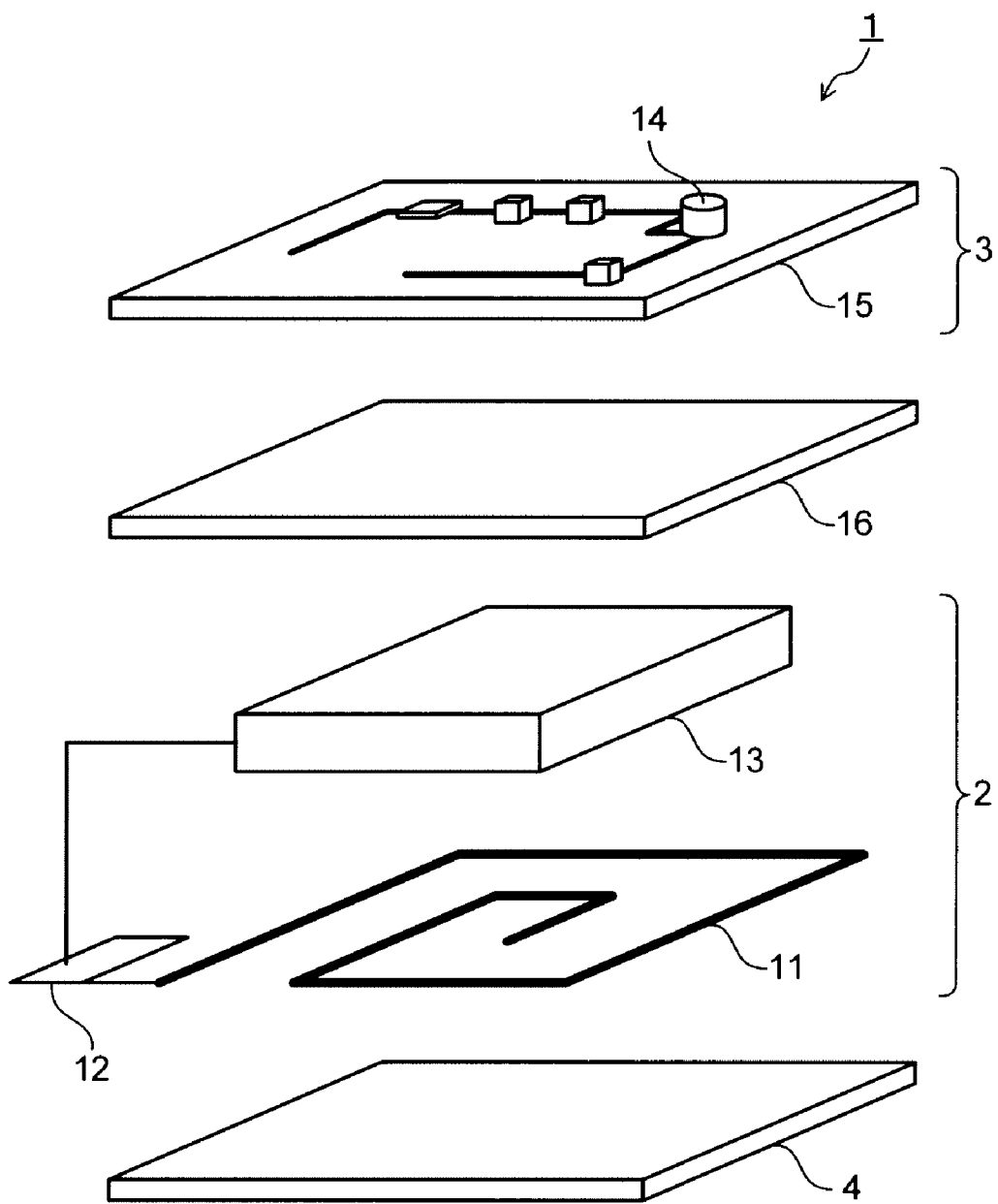
FIG. 2 is a view showing the structure of a modification example of the electronic apparatus shown in FIG. 1.

Hereinafter, embodiments for implementing the present invention will be explained. FIG. 1 and FIG. 2 show the structure of an electronic apparatus according to a first embodiment of the present invention. An electronic apparatus 1 shown in FIG. 1 and FIG. 2 includes a power receiving device 2 and an electronic apparatus main body 3, in which non-contact charging method is applied. The power receiving device 2 and the electronic apparatus main body 3 are arranged in a housing 4, and they constitute the electronic apparatus 1.

The power receiving device 2 includes a power receiving coil 11 having a spiral coil, a rectifier 12 rectifying an alternating voltage generated in the power receiving coil 11, and a secondary battery 13 to which a direct current voltage rectified in the rectifier 12 is charged. The electronic apparatus main body 3 includes an electronic device 14 which is supplied with the direct current voltage charged in the secondary battery 13 of the power receiving device 2 for operation, and a circuit board 15 on which the electronic device 14 is mounted. Other than the electronic device 14 and the circuit board 15, the electronic apparatus main body 3 may include a part or a device according to the function, operation, or the like of the electronic apparatus 1.

As the spiral coil constituting the power receiving coil 11, a flat coil made by winding a metal wire such as copper wire in a flat state, a flat coil formed by printing a metal powder paste in a spiral shape, or the like is used. The winding shape of the spiral coil is not limited particularly, and may be a circle shape, an elliptic shape, a quadrangle, a polygon, or the like. The number of times of winding the spiral coil is set according to required characteristics.

The rectifier 12 is, for example, a semiconductor element such as a transistor or a diode. The quantity of rectifiers 12 is arbitrary, and one or two or more rectifiers 12 are used as necessary. The rectifier 12 may be formed by a film forming technology such as TFT. In FIG. 1 and FIG. 2, the rectifier 12 is disposed on the side of the power receiving coil 11 of the circuit board 15. The rectifier 12 may be provided on the surface opposite to the power receiving coil 11 of the circuit board 15. The secondary battery 13 is one capable of charging/discharging, for which ones with various shapes such as flat shape, button shape, and the like can be used.

The electronic device 14 includes various types of elements and parts constituting the circuit such as a resistor element, a capacitor element, an inductance element, a control element, a storage element, and the like. Further, there may be parts or devices other than them. The circuit board 15 is obtained by forming a circuit on a surface of or inside an insulating substrate such as a resin substrate, a ceramic substrate, or the like. The electronic device 14 is mounted on the circuit board 15. The electronic device 14 may include one that is not mounted on the circuit board 15.

The electronic apparatus 1 of the first embodiment includes, as shown in FIG. 1 for example, a magnetic foil 16 disposed between the spiral coil (power receiving coil) 11 and the secondary battery 13. That is, the spiral coil 11 and the secondary battery 13 are arranged sandwiching the magnetic foil 16. The spiral coil 11 has a flat portion as at least one portion thereof, and this flat portion is arranged along a surface of the magnetic foil 16. When seen as the power receiving device 2, the magnetic foil 16 is arranged between the spiral coil 11 and the secondary battery 13 constituting this device.

As shown in FIG. 2, the magnetic foil 16 may be disposed between the secondary battery 13 and the circuit board 15. In this case, the magnetic foil 16 is arranged between the spiral coil 11 and the circuit board 15. Further, the magnetic foil 16 may be arranged between the spiral coil 11 and the rectifier 12 or between the spiral coil 11 and the electronic device 14. The magnetic foil 16 is arranged in one or more of these respective positions. The magnetic foil 16 may be arranged in two or more of the positions.

Figure 3:
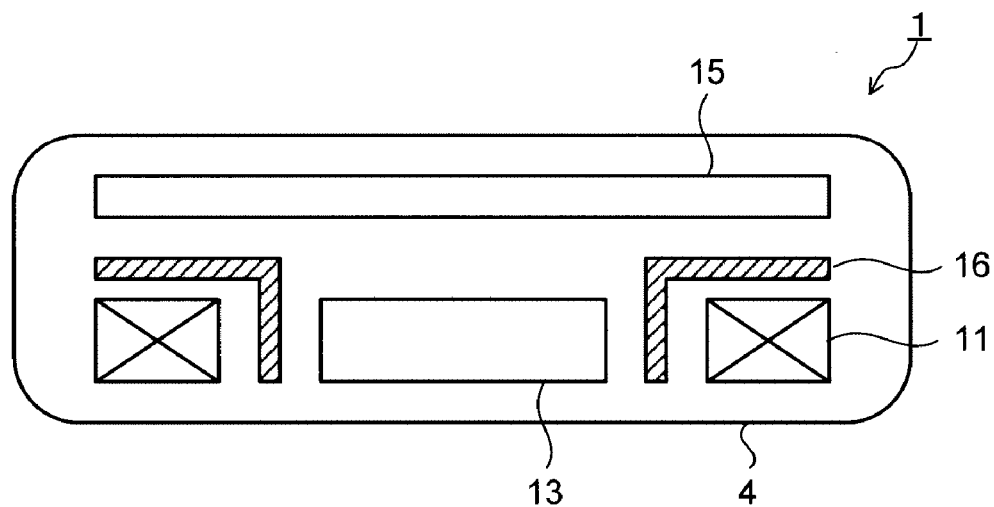
FIG. 3 is a view showing the structure of an electronic apparatus according to a second embodiment of the present invention.

FIG. 3 shows an electronic apparatus according to a second embodiment. In an electronic apparatus 1 shown in FIG. 3, the spiral coil 11 is disposed around the secondary battery 13. In other words, the secondary battery 13 is disposed in a cavity portion formed in the vicinity of the center of the spiral coil 11. The magnetic foil 16 has a shape in which the vicinity of the center thereof protrudes so that the foil exists also between the spiral coil 11 and the secondary battery 13, in addition to the position between the spiral coil 11 and the circuit board 15. Note that in FIG. 3, illustrations of the rectifier 12 and the electronic device 13 are omitted.

Also in the electronic apparatus 1 of the second embodiment, the magnetic foil 16 may be arranged between the spiral coil 11 and the circuit board 15, between the spiral coil 11 and the rectifier 12, or between the spiral coil 11 and the electronic device 14. The magnetic foil 16 is arranged in one or more of these respective positions. The magnetic foil 16 may be arranged in two or more of the positions.

To make the lateral width of the electronic apparatus 1 small, the structure of the first embodiment is preferable. To make the thickness of the electronic apparatus 1 thin, the structure of the second embodiment is preferable. These embodiments are selected appropriately in connection with the structure or the like of the applied electronic apparatus 1. The structure of the electronic apparatus 1 is not limited to the FIG. 1 to FIG. 3. Arrangement of the spiral coil 11, the secondary battery 13 and the circuit board 15 can be changed in various ways. For example, the secondary battery, the circuit board, and the spiral coil may be arranged in order from the top side. The magnetic foil is arranged for example between the circuit board and the spiral coil.

When the magnetic foil 16 is arranged between the spiral coil 11 and the circuit board 15, it is possible to simply stack the spiral coil 11/magnetic foil 16/circuit board 15, or to fix them with an adhesive or a brazing material with each other. The same applies to other cases, and the respective components may just be stacked, or may be fixed with an adhesive or a brazing material with each other.

As described above, magnetic flux passing through the spiral coil 11 during charging can be shielded by the magnetic foil 16, by arranging the magnetic foil 16 in at least one of the position between the spiral coil 11 and the secondary battery 13, the position between the spiral coil 11 and the rectifier 12, the position between the spiral coil 11 and the electronic device 14, and the position between the spiral coil 11 and the circuit board 15. Accordingly, magnetic flux interlinked with the circuit board 15 or the like in the electronic apparatus 1 decreases, and thus generation of overcurrent due to electromagnetic induction can be suppressed.

Therefore, it is possible to suppress heating due to the overcurrent in the electronic device 14 mounted on the circuit board 15 and the rectifier 12, heating of the circuit of the circuit board 15, as well as generation of noise due to the overcurrent. Suppression of heating in the electronic apparatus 1 contributes to improvement of the performance and reliability of the secondary battery 13. Furthermore, by suppressing heating due to the overcurrent, the power supplied to the power receiving device 2 can be increased. The magnetic foil 16 also functions as a magnetic core with respect to the spiral coil 11, and hence power receiving efficiency as well as charging efficiency can be increased. They contribute to reduction of charging time to the electronic apparatus 1.

As the magnetic foil 16, a magnetic alloy thin ribbon (magnetic alloy ribbon), a magnetic alloy thin plate, or the like is used. As the magnetic foil 16, various types of soft magnetic materials can be applied. Specific structures for the magnetic foil 16 include ones described below. It is preferable that the magnetic alloy thin ribbon is constituted of a Co-based amorphous alloy, an Fe-based amorphous alloy, or an Fe-based microcrystal alloy. All of these magnetic materials can be produced by roll quenching method (single roll or double roll), and hence a thin ribbon with an average plate thickness of 50 μm or lower can be obtained easily.

It is preferable that the amorphous alloy constituting the magnetic alloy thin ribbon has constitution represented by a general formula:

$$(T_{1-a}M_a)_{100-b}X_b \quad (1)$$

(where T represents at least one kind of element selected from Co and Fe, M represents at least one kind of element selected from Ni, Mn, Cr, Ti, Zr, Hf, Mo, V, Nb, W, Ta, Cu, Ru, Rh, Pd, Os, Ir, Pt, Re and Sn, X represents at least one kind of element selected from B, Si, C and P, and a and b are numbers satisfying $0 \leq a \leq 0.3$, $10 \leq b \leq 35$ at %). In the formula (1), when the element T includes both Co and Fe, it is called a Co-based amorphous alloy when it include more Co, and is called an Fe-based amorphous alloy when it include more Fe.

In the formula (1), for the element T, the composition ratio is adjusted according to required magnetic characteristics such as magnetic flux density, magnetostriction value, iron loss, and the like. The element M is an element added for control or the like of thermal stability, corrosion resistance, and crystallization temperature. It is preferable that the added amount of the element M is 0.3 or smaller as the value a. When the added amount of the element M is too large, the amount of the element T decreases relatively, and hence the magnetic characteristics of the amorphous magnetic alloy thin ribbon become low. It is preferable that the value a indicating the added amount of the element M is 0.01 or higher in practice. It is more preferable that the value a is 0.15 or smaller.

The element X is an element essential for obtaining an amorphous alloy. Particularly, B (boron) is an element effective for turning a magnetic alloy to amorphous. Si (silicon) is an element effective for encouraging formation of an amorphous phase, or for increasing a crystallization temperature. When the content of element X is too large, decrease in permeability or fragility occurs, but when it is too small conversely, turning to amorphous becomes difficult. From these points, it is preferable that the content of element X is in the range of 10 at % to 35 at %. It is more preferable that the content of element X is in the range of 15 at % to 25 at %.

An example of the Fe-based microcrystal alloy thin ribbon is one constituted of an Fe-based alloy having constitution represented substantially by a general formula:

$$Fe_{100-c-d-e-f-g-h}A_cD_dE_eSi_fB_gZ_h \quad (2)$$

(where A represents at least one kind of element selected from Cu and Au, D represents at least one kind of element selected from Ti, Zr, Hf, V, Nb, Ta, Cr, Mo, W, Ni, Co and rare earth elements, E represents at least one kind of element selected from Mn, Al, Ga, Ge, In, Sn and platinum group elements, and Z represents at least one kind of element selected from C, N and P, and c, d, e, f, g and h represents numbers satisfying 0.01 at %≦c≦8 at %, 0.01 at %≦d≦10 at %, 0 at %≦e≦10 at %, 10 at %≦f≦25 at %, 3 at %≦g≦12 at %, 15 at %≦f+g+h≦35 at %), in which 20% or more of the metallic structure by area ratio is constituted of microcrystal grains with a grain diameter of 50 nm or smaller.

In the formula (2), the element A is an element which increases corrosion resistance, prevents crystal grains from becoming coarse, and improves magnetic characteristics such as iron loss and permeability. When the content of element A is too small, the effect of preventing the crystal grains from becoming coarse cannot be obtained sufficiently, but when it is too large conversely, the magnetic characteristics deteriorate. Therefore, it is preferable that the content of element A is in the range of 0.01 at % to 8 at %. The element D is an element effective for making the crystal grains uniform and reducing magnetostriction. It is preferable that the content of element D is in the rage of 0.01 at % to 10 at %.

The element E is an element effective for improving a soft magnetic characteristic and corrosion resistance. It is preferable that the content of element E is 10 at % or less. Si and B are elements encouraging turning of an alloy to amorphous while manufacturing the thin ribbon. It is preferable that the content of Si is in the range of 10 at % to 50 at %, and the content of B is in the range of 3 at % to 12 at %. An element Z may be included as an element for encouraging turning to amorphous, other than Si and B. In this case, it is preferable that the total content of Si, B and element Z is in the range of 15 at % to 35 at %. It is preferable that the microcrystal structure is particularly in a mode such that crystal grains with a grain diameter of 5 nm to 30 nm are made to exist in the alloy in the range of 50% to 90% by area ratio.

An amorphous alloy thin ribbon is produced by, for example, roll quenching method (molten metal quenching method). Specifically, it is produced by quenching an alloy material adjusted to a predetermined constitution ratio from a molten state. The microcrystal alloy thin ribbon can be obtained by, for example, producing the amorphous alloy thin ribbon by liquid quenching method, and thereafter performing thermal treatment at a temperature in the range of −50° C. to +120° C. with respect to the crystallization temperature thereof for one minute to five hours so as to precipitate microcrystal grains. The microcrystal alloy thin ribbon can also be obtained by a method to precipitate microcrystal grains directly by controlling the quenching speed of the liquid quenching method.

It is preferable that the average thickness of the magnetic alloy thin ribbon constituted of the amorphous alloy or the Fe-based microcrystal alloy is in the range of 5 μm to 50 μm. The magnetic alloy thin ribbon with an average plate thickness of 50 μm or smaller has an advantage that formation processing of a bending portion and an opening, which will be described later, can be performed easily. When the average thickness of the magnetic alloy thin ribbon is larger than 50 μm, the permeability becomes low, and there is a fear of causing large loss. When the average thickness of the magnetic alloy thin ribbon is smaller than 5 μm, no further effect can be obtained, and moreover it conversely leads to increase in manufacturing costs. It is more preferable that the thickness of the magnetic alloy thin ribbon is in the range of 5 μm to 35 μm, more preferably in the range of 10 μm to 25 μm.

The magnetic foil 16 may be formed of a permalloy, a silicon steel plate, or the like instead of the amorphous alloy and the Fe-based microcrystal alloy. In this case, a molten ingot or a sintered ingot is subjected to processing such as forging or rolling, so as to turn it to a thin plate. It is preferable that the plate thickness of the magnetic alloy thin plate constituted of the permalloy, the silicon steel plate, or the like is in the range of 10 μm to 40 μm. When the plate thickness of the magnetic alloy thin plate is larger than 40 μm, loss in the magnetic plate increases due to the overcurrent. On the other hand, when the plate thickness of the magnetic alloy thin plate is smaller than 10 μm, a sufficient shield effect cannot be obtained. It is more preferable that the plate thickness of the magnetic alloy thin plate is in the range of 10 μm to 25 μm.

The above-described magnetic foil 16 has a characteristic that a μr'·t value expressed as the product of a real component μr' of relative permeability and a plate thickness t is 30000 or larger. The μr' is a real component of the relative permeability of the magnetic foil 16, and t is the plate thickness [μm] of the magnetic foil 16. When the magnetic foil 16 is constituted of a stacked body of a plurality of foils, the plate thickness t indicates the sum total of thicknesses of the plurality of foils. When the stacked body of foils is applied to only one portion, the thickness (summed plate thickness) of a part where a largest number of foils are stacked is taken as the plate thickness t. When stacking the plurality of magnetic foils via a non-magnetic body layer such as an insulating layer, the thickness of the non-magnetic body layer is not included in the plate thickness t.

When the μr'·t value is 30000 or larger, electromagnetic coupling between the power feeding coil and the power receiving coil becomes large by the magnetic foil 16, and hence effective transmission can be realized. Therefore, by suppressing transmitted power amount, the magnetic foil 16 becomes difficult to be saturated magnetically. Further, regardless of saturation/unsaturation of the magnetic foil 16, leakage of magnetic flux from the magnetic foil 16 is suppressed, and hence the overcurrent generated in the rectifier 12, the electronic device 14, the circuit board 15, or the like can be suppressed. Accordingly, it becomes possible to suppress heating in the electronic apparatus 1. Furthermore, by increasing the inductance of the magnetic foil 16, the power receiving efficiency by the power receiving coil 11 can be improved. Accordingly, heating due to the overcurrent can be suppressed.

For example, when charging a secondary battery with a large charging capacity such as Li-ion secondary battery, it is necessary to increase power to be transmitted. This means that the transmitted magnetic flux amount increases in the non-contact charging method. By intensifying the electromagnetic coupling between the power feeding coil and the power receiving coil by the magnetic foil 16, the increased magnetic flux can be received efficiently by the power feeding coil. Specifically, the power receiving efficiency by the power receiving coil 11 improves. Therefore, the power receiving rate for satisfying the capacity of the secondary battery 13 can be decreased. Accordingly, the magnetic flux amount transmitted from the power feeding coil (primary coil) to the power receiving coil (secondary coil) 11 can be decreased, and thereby it becomes possible to suppress generation of overcurrent due to the leakage of magnetic flux and further the heating due to the overcurrent.

When $\mu r' \cdot t$ of the magnetic foil 16 is smaller than 30000, the effect of suppressing the overcurrent is insufficient. Thus, when the transmitted power is 1 W·h or larger for example, the secondary battery 13 heats up more than necessary. This is because the magnetic characteristics of the magnetic foil 16 are saturated by the overcurrent generated while receiving power, and the overcurrent cannot be suppressed any longer. The magnetic foil 16 with the $\mu r' \cdot t$ value of 30000 or larger is preferable when a Li-ion secondary battery having a large charging capacity is applied to the secondary battery 13. Particularly, the magnetic foil 16 with the $\mu r' \cdot t$ value of 30000 or larger is effective when the power receiving speed is 0.25 W/h or larger. It is more preferable that the $\mu r' \cdot t$ value of the magnetic foil 16 is 40000 or larger, more preferably 90000 or larger.

To make the $\mu r' \cdot t$ value of the magnetic foil 16 large, the real component $\mu r'$ of the relative permeability of the magnetic foil 16 should be made large, or the plate thickness t should be made large. Examples of a method to increase the relative permeability of the magnetic foil 16 include applying a material constitution with a large relative permeability to the magnetic foil 16, performing thermal treatment to the magnetic foil 16, and the like. For example, for the magnetic foil 16 constituted of the amorphous magnetic alloy thin ribbon, it is effective to perform thermal treatment at a temperature of 200° C. or higher (crystallization temperature −20° C.) for 10 minutes to 120 minutes. These are applied in an appropriately combined manner.

When the average plate thickness of the magnetic foil 16 is too thick, the permeability of the magnetic foil 16 and processibility thereof decreases as described above. Accordingly, it is preferable that the average plate thickness of the magnetic foil 16 is within the above-described range. To make the plate thickness t large while satisfying such a condition, it is preferable to apply a stacked body of the magnetic alloy thin ribbon and the magnetic alloy thin plate to the magnetic foil 16. By stacking and using the magnetic alloy thin ribbon and the magnetic alloy thin plate, the plate thickness t of the magnetic foil 16 can be made thick while suppressing increase in thickness of each thin ribbon or thin plate. Accordingly, a magnetic foil 16 with the $\mu r' \cdot t$ value of 30000 or larger can be obtained.

In view of preventing electromagnetic saturation, it is more preferable that the saturated magnetic flux density Ms of the magnetic foil 16 is 0.50 T or higher. Further, it is preferable that the electrical resistance value R ($\Omega \cdot m$) of the magnetic foil 16 satisfies $R \cdot \mu r' \geq 1.01 \times 10^{-3}$. When the plate thickness of the magnetic foil 16 is set thicker than the thickness of a skin depth due to skin effect, the portion thereabove barely exhibits the effect as a magnetic body. Therefore, it is preferable that the plate thickness of the magnetic foil 16 is equal to or smaller than the thickness of the skin depth. When the thickness of the skin depth=$\delta$, $\mu r' \cdot t$=40000, $\mu_0$=vacuum permeability=$4\pi \times 10^{-7}$, film thickness=t, and $\omega$=angular frequency, the above-described $R \cdot \mu r'$ value is obtained from $(\mu_0 \cdot \mu r' \cdot \delta) = (\mu_0 \cdot \mu r')(2 \cdot R/(\mu_0 \cdot \mu r' \cdot \omega))^{1/2} \geq (\mu_0 \cdot \mu r' \cdot t) = \mu_0 \cdot 40000$. This means that with a material having low permeability, adequate $\mu_0 \cdot \mu r'$ cannot be obtained and heating cannot be suppressed sufficiently.

Figure 4:
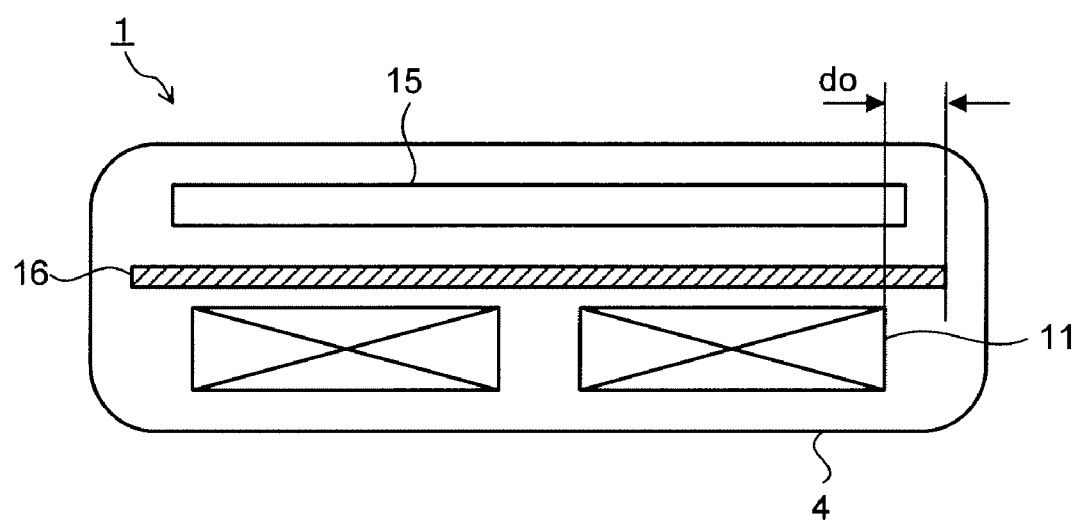
FIG. 4 is a cross-sectional view showing an example of providing a protruding portion on an outer peripheral portion of a magnetic foil according to the embodiment of the present invention.

Next, a method and a structure which further suppress problems due to the overcurrent will be explained. It is preferable that, as shown in FIG. 4, the magnetic foil 16 has an outer peripheral end portion extending outward farther than an outer peripheral portion of the spiral coil 11. In FIG. 4, "do" is a portion (protruding portion) of the magnetic foil 16 that protrudes to the outside of the spiral coil 11. With such a structure, magnetic flux generated in the spiral coil 11 can be blocked more effectively by the magnetic foil 16. This contributes to suppressing the overcurrent based on the magnetic flux interlinked with the substrate or the like, and further to suppressing heating due to the overcurrent and/or decrease in power receiving efficiency.

Figure 5:
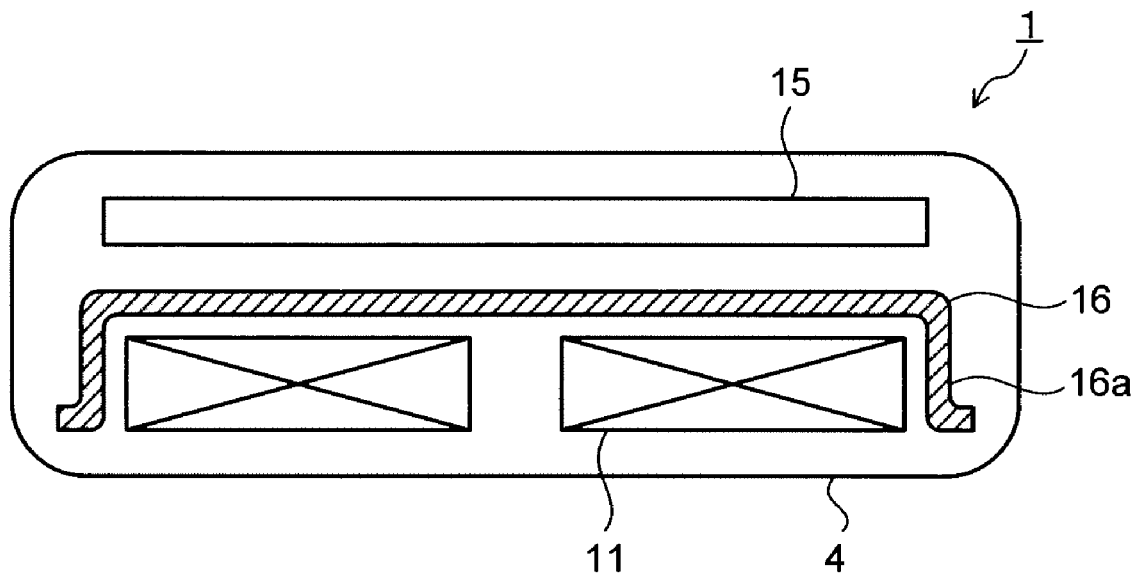
FIG. 5 is a cross-sectional view showing another example of providing a protruding portion on the outer peripheral portion of the magnetic foil according to the embodiment of the present invention.
Figure 6:
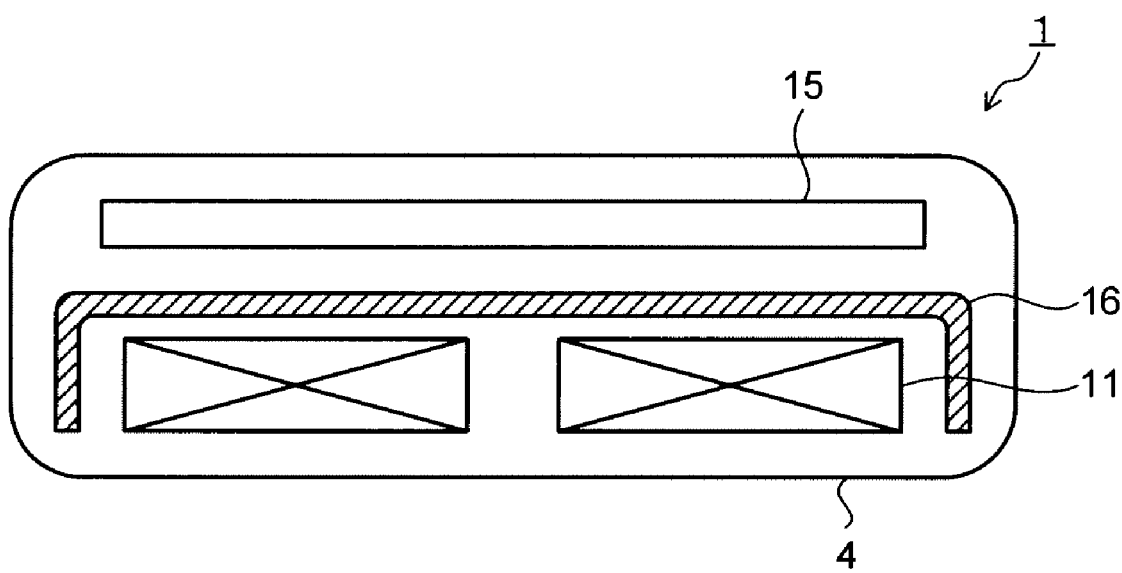
FIG. 6 is a cross-sectional view showing still another example of providing a protruding portion on the outer peripheral portion of the magnetic foil according to the embodiment of the present invention.

The protruding portion do of the magnetic foil 16 may be bent on the side (spiral coil 11 side) opposite to the circuit board 15, as shown in FIG. 5 and FIG. 6. In FIG. 5 and FIG. 6, the magnetic foil 16 has a bending portion 16a which is the outer peripheral end portion thereof being bent on the side opposite to the circuit board 15. The shape of the bending portion 16a may be bent several times as shown in FIG. 5, or may be bent once as shown in FIG. 6. By bending the outer peripheral portion of the magnetic foil 16 on the spiral coil 11 side, the effect of suppressing the overcurrent can be increased further.

Further, the magnetic foil 16 also functions as a magnetic core of the spiral coil 11. In this case, by bending the outer peripheral end portion of the magnetic foil 16 on the spiral coil 11 side, the gap between the magnetic foil 16 as a magnetic core and the power feeding coil (primary coil) can be made small. Accordingly, it becomes possible to increase the power receiving efficiency. At this time, it becomes more effective as the area of the magnetic foil 16 that is made close to the power feeding coil becomes larger. Thus, as shown in FIG. 5, by orienting the outer peripheral end portion of the magnetic foil 16 to the direction substantially in parallel to the winding surface normal of the power feeding coil, it becomes possible to form the magnetic circuit more effectively so as to increase the power receiving efficiency.

Figure 7:
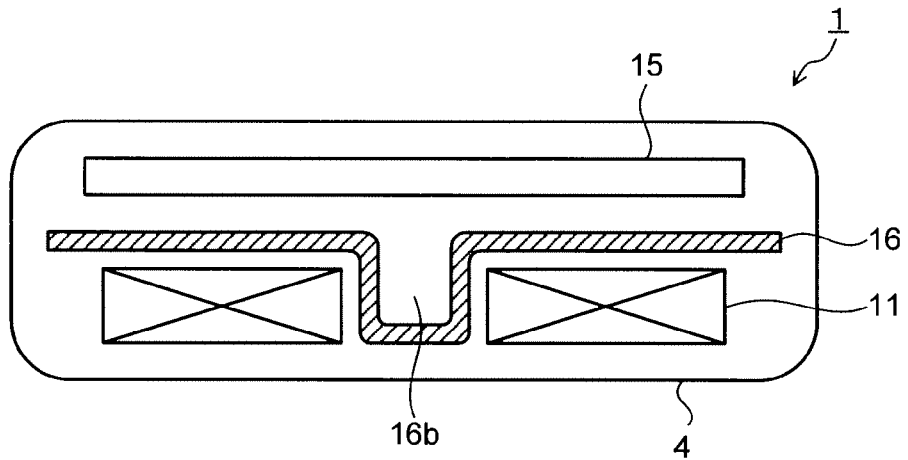
FIG. 7 is a cross-sectional view showing an example of providing an opening in a center portion of the magnetic foil according to the embodiment of the present invention.
Figure 8:
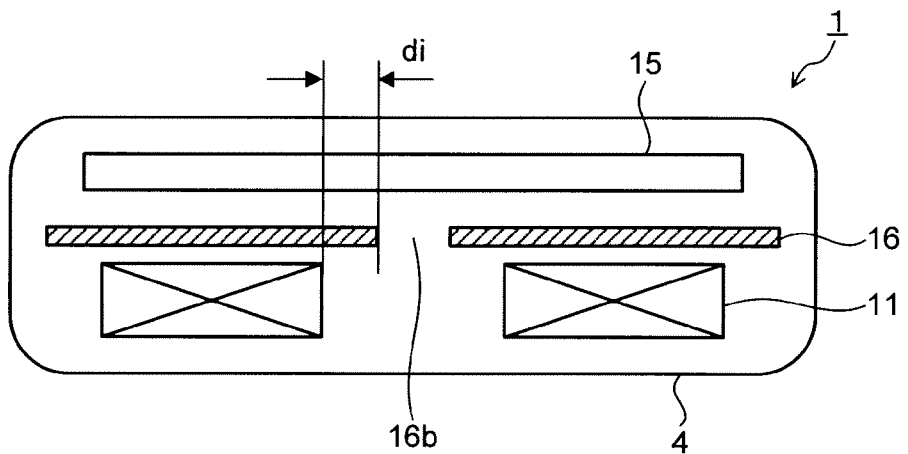
FIG. 8 is a cross-sectional view showing another example of providing an opening in the center portion of the magnetic foil according to the embodiment of the present invention.
Figure 9:
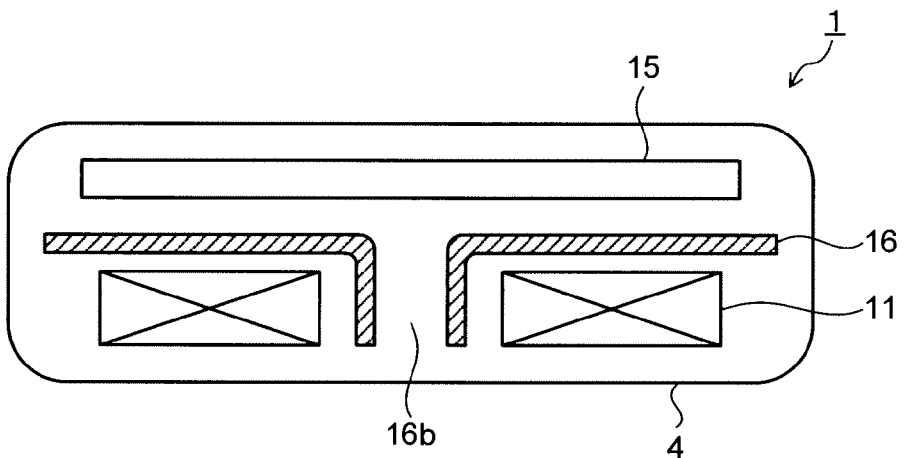
FIG. 9 is a cross-sectional view showing still another example of providing an opening in the center portion of the magnetic foil according to the embodiment of the present invention.

In a center portion of the magnetic foil 16, an opening 16b may be provided as shown in FIG. 7, FIG. 8 and FIG. 9. The opening 16b of the magnetic foil 16 is provided in the position corresponding to a center portion of the spiral coil 11. Examples of the shape of the opening 16b include a shape such that the center portion of the magnetic foil 16 is recessed in the direction of the spiral coil 11 as shown in FIG. 7 (projecting shape), a shape such that the center portion of the magnetic foil 16 is bored as shown in FIG. 8, a shape such that the center portion of the magnetic foil 16 is bent as shown in FIG. 9, and the like. By providing the opening 16b so as to make the gap with the power feeding coil (primary coil) small, it becomes possible to form the magnetic circuit more effectively to increase the power receiving efficiency.

In FIG. 8, "di" indicates a portion of the magnetic foil 16 that exists inward farther than the spiral coil 11. The bending portion shown in FIG. 9 is a portion such that the portion di existing inward farther than the spiral coil 11 of the magnetic foil 16 is bent in the direction of the spiral coil 11. The structure in which the outer peripheral portion of the magnetic foil 16 protrudes to the outside of the spiral coil 11 and the structure in which the opening is bored in the center portion may each be used independently, or the both may be adopted. By adopting both of these structures, the effect of improving the power receiving efficiency becomes more significant. Note that in FIG. 4 to FIG. 9, illustrations of the rectifier 12, the secondary battery 13, and the electronic device 13 are omitted. The same applies to FIG. 15.

Further, to suppress the overcurrent in the magnetic foil 16, it is preferable to provide slits in the magnetic foil 16. It is effective that the magnetic foil 16 is divided into several portions by the slits, so as to cut the electrical path (or current path) thereof. Examples of the magnetic foil 16 in which the slits are provided are shown in FIG. 10 to FIG. 14. In these views, numeral 17 denotes a slit. When a slit 17 cuts the magnetic foil 16, it corresponds to a dividing line of the magnetic foil 16.

Figure 10:
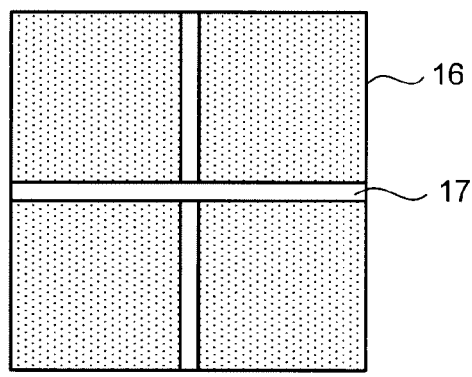
FIG. 10 is a plan view showing an example of forming slits in the magnetic foil according to the embodiment of the present invention.
Figure 11:
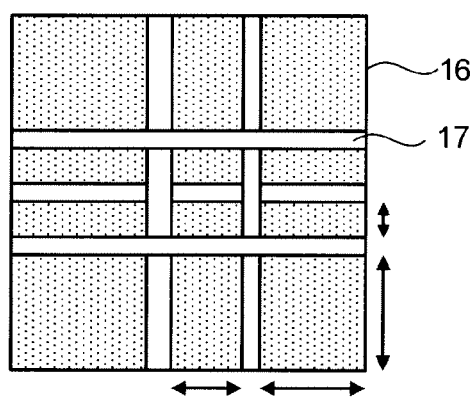
FIG. 11 is a plan view showing another example of forming slits in the magnetic foil according to the embodiment of the present invention.
Figure 12:
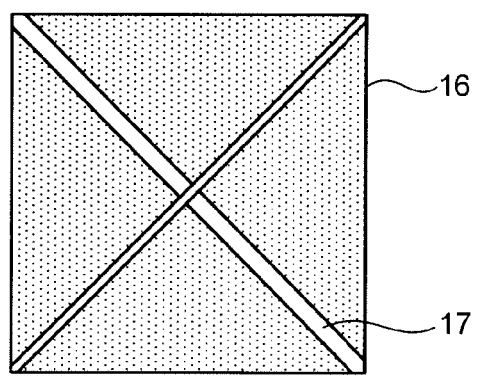
FIG. 12 is a plan view showing still another example of forming slits in the magnetic foil according to the embodiment of the present invention.

FIG. 10 shows a state that slits 17 orthogonal to each other vertically and horizontally are formed in the magnetic foil 16. The magnetic foil 16 shown in FIG. 10 is divided into four. FIG. 11 shows a state that a plurality of slits 17 are formed in each of a vertical direction and a horizontal direction in the magnetic foil 16. When a plurality of slits 17 are formed as shown in FIG. 11, the sizes of the slits 17 and distances between the slits 17 are arbitrary. FIG. 12 shows a state that slits 17 orthogonal to each other in diagonal directions of the magnetic foil 16 are formed. Thus, the slits 17 are not limited to horizontal or vertical ones, and may be formed with an angle. Although not shown, the slits may be formed radially.

Figure 13:
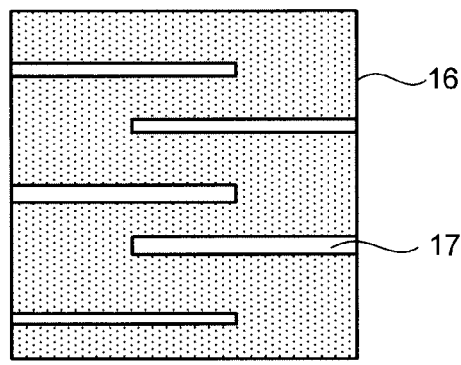
FIG. 13 is a plan view showing yet another example of forming slits in the magnetic foil according to the embodiment of the present invention.
Figure 14:
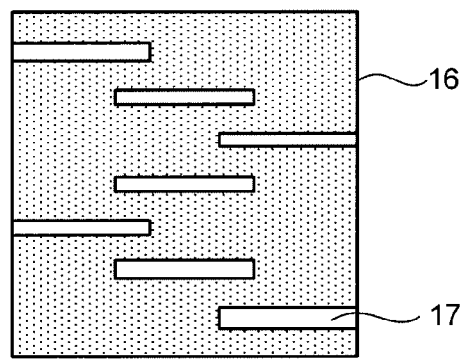
FIG. 14 is a plan view showing yet another example of forming slits in the magnetic foil according to the embodiment of the present invention.

FIG. 13 shows a state that slits 17 are provided each from one end of the magnetic foil 16 to a middle portion. The slits 17 are each formed from one of opposing sides toward the other side. FIG. 14 shows a state that slits 17 are formed from both ends of the magnetic foil 16 to a middle portion, and further the slits 17 are formed in the vicinity of the center thereof. When an electrical path is cut, the magnetic flux becomes larger toward the center portion of the spiral coil 11. Thus, it is effective to provide the slits 17 so that an area of the magnetic foil 16 after dividing becomes smaller toward the center portion. However, the magnetic resistance gets larger as the number of slits (number of divisions) is increased, and the power receiving efficiency decreases. Accordingly, it is preferable to provide the slits 17 considering both the effect of suppressing the overcurrent and the power receiving efficiency.

Figure 15:
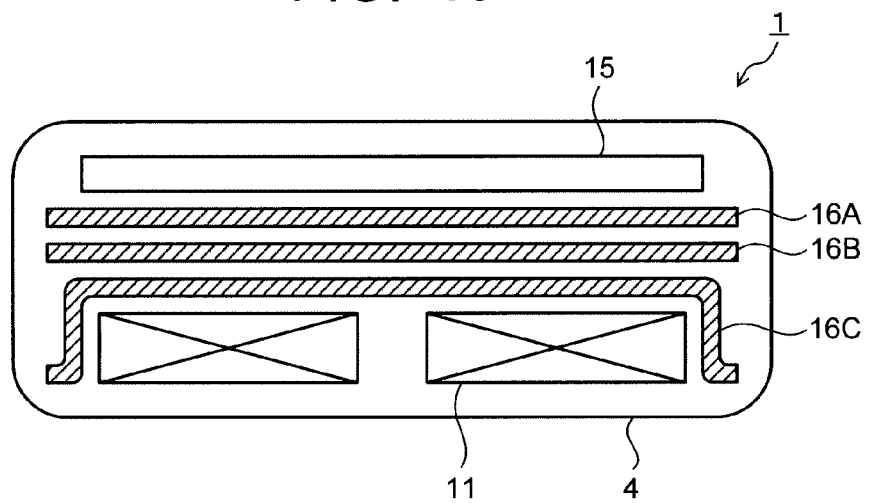
FIG. 15 is a cross-sectional view showing an example of arranging a plurality of magnetic foils in the electronic apparatus of the embodiment of the present invention.

To improve both the effect of suppressing the overcurrent and the power receiving efficiency, it is effective to use a plurality of magnetic foils. An example of using a plurality of magnetic foils is shown in FIG. 15. In an electronic apparatus 1 shown in FIG. 15, three magnetic foils 16A, 16B, 16C are arranged between the spiral coil 11 and the circuit board 15. The magnetic foil 16A has slits 17 as shown in FIG. 10. The magnetic foil 16B has slits 17 as shown in FIG. 11. The magnetic foil 16C has no slit, and an outer peripheral portion thereof is bent.

Thus, using the magnetic foil 16C in which the bending portion 16a is provided and both the magnetic foils 16A, 16B in which the slits 17 are provided, both the effect of suppressing the overcurrent and the power receiving efficiency can be increased. The magnetic foil 16 in which the slits 17 are formed may be combined with the magnetic foil 16 provided with the opening 16b, or the magnetic foil 16 including both the bending portion 16a and the opening 16b and the magnetic foil 16 in which the slits 17 are formed may be combined. When using three or more (n number or more of) magnetic foils 16, two ((n−1) number) thereof may be magnetic foils 16 with the same shape (structure), or identical ones may be used for all of the three (n number of) magnetic foils 16.

In the power receiving device 2 of the above-described embodiment and the electronic apparatus 1 using the same, since the overcurrent due to the magnetic flux interlinked with the spiral coil 11 is suppressed, heating in the apparatus can be reduced, and the power receiving efficiency can be improved. Thus, when feeding power, the power can be made large, and the charging time can be reduced. The electronic apparatus 1 of this embodiment is preferable for mobile phones, mobile audio devices, digital cameras, game machines, and the like. The electronic apparatus 1 as such is set on the power feeding device, and charging is performed in a non-contact manner.

Figure 16:
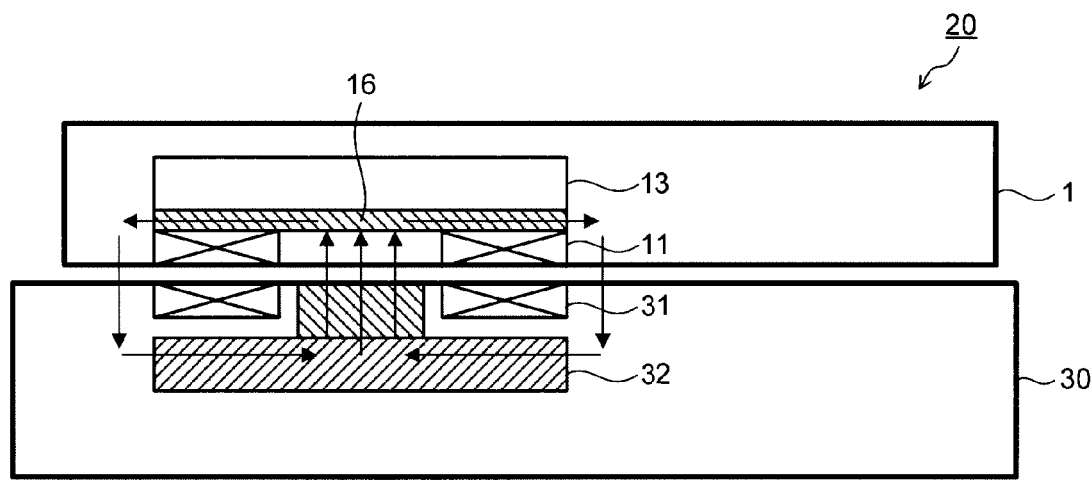
FIG. 16 is a view showing the structure of a non-contact charging system according to the embodiment of the present invention.
Figure 17:
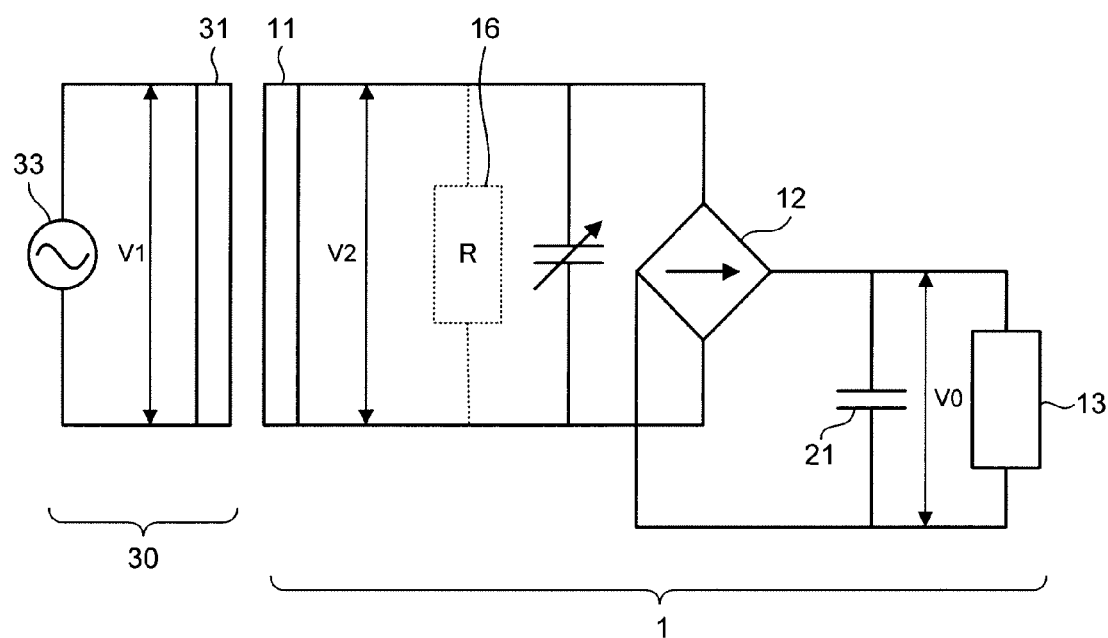
FIG. 17 is a circuit diagram of the non-contact charging system shown in FIG. 16.

FIG. 16 shows a structure of a non-contact charging system according to an embodiment of the present invention. FIG. 17 is a circuit diagram of the non-contact charging system shown in FIG. 16. In the non-contact charging system 20 shown in FIG. 16 and FIG. 17, the electronic apparatus 1 is the one shown in the above-described embodiments. In FIG. 16, an arrow shows a flow of magnetic flux. In FIG. 17, numeral 21 is a capacitor for smoothing. The power feeding device 30 includes a power feeding coil 31, a power feeding coil magnetic core 32, and a power supply 33 applying an alternating voltage to the power feeding coil 31. When the electronic apparatus 1 is set on the power feeding device 30, the power feeding coil 31 is arranged in a non-contact manner with the power receiving coil 11.

Charging by the non-contact charging system 20 is performed as follows. First, an alternating voltage is applied from the power supply 33 to the power feeding coil 31 of the power feeding device 30, and magnetic flux is generated in the power feeding coil 31. The magnetic flux generated in the power feeding coil 31 is transmitted to the power receiving coil 11 arranged in a non-contact manner with the power feeding coil 31. In the power receiving coil 11, upon reception of the magnetic flux, an alternating voltage is generated by electromagnetic induction. This alternating voltage is rectified in the rectifier 12. A direct current voltage rectified in the rectifier 12 is charged to the secondary battery 13. Thus, in the non-contact charging system 20, transmission of power is performed in a non-contact manner.

Next, concrete examples of the present invention and evaluation results thereof will be explained.

(Charging System)

As the non-contact charging system, a charging system for a mobile phone was prepared. The power feeding device is one in which power from an AC power supply is converted into a constant electromagnetic wave via a control circuit, and a primary coil (power feeding coil) transmitting the electromagnetic wave is arranged in the vicinity of a mounting table. The mobile phone includes, as a power receiving device, a secondary coil (power receiving coil) constituted of a spiral coil, a circuit board on which a rectifier rectifying alternating power generated in the secondary coil is mounted, and a secondary battery (Li-ion secondary battery). The secondary coil is one such that a copper wire is wound in a plane shape with an outer periphery of 30 mm and an inner periphery of 23 mm.

COMPARATIVE EXAMPLE 1

In the above-described mobile phone, a power receiving device was constituted without using a magnetic foil. The mobile phone using this power receiving device and the non-contact charging system were designated as comparative example 1.

EXAMPLE 1

As a magnetic foil, there was prepared an amorphous alloy thin ribbon with a real component μr' of relative permeability of 5000, an average plate thickness of 18 μm, and constitution of $CO_{70}Fe_5Si_5B_{20}$ (atomic ratio). No thermal treatment is performed on the amorphous alloy thin ribbon. The amorphous alloy thin ribbon has a shape with the protruding amount do of the outer peripheral portion being 6 mm. This amorphous alloy thin ribbon was arranged, as shown in FIG. 1, between the secondary coil (power receiving coil 11) and the secondary battery 13. A mobile phone using a power receiving device having such a magnetic foil and the non-contact charging system were designated as example 1.

EXAMPLES 2 TO 10

Using an amorphous alloy thin ribbon with the same constitution as the example 1, power receiving devices were made similarly to the example 1 except that the thermal treatment condition, the average plate thickness, and the number of stacks are changed to the conditions shown in Table 1. Mobile phones using these power receiving devices and non-contact charging systems were designated as examples 2 to 10.

EXAMPLES 11 TO 14

As magnetic foils, amorphous alloy thin ribbons each having constitution of $Fe_{78}B_{14}Si_8$ (atomic ratio) were prepared. The thermal treatment condition, the average plate thickness, and the number of stacks of these amorphous alloy thin ribbons are as shown in Table 1. Power receiving devices were made similarly to the example 1 except using such amorphous alloy thin ribbons. Mobile phones using these power receiving devices and non-contact charging systems were designated as examples 11 to 14.

EXAMPLES 15 TO 17

As magnetic foils, there were prepared amorphous alloy thin ribbons having constitution of $CO_{76}Fe_4Ni_3Si_6B_{11}$ (atomic ratio). The thermal treatment condition, the average plate thickness, and the number of stacks for these amorphous alloy thin ribbons are as shown in Table 1. Power receiving devices were made similarly to the example 1 except using such amorphous alloy thin ribbons. Mobile phones using these power receiving devices and non-contact charging systems were designated as examples 15 to 17.

EXAMPLE 18

As a magnetic foil, there was prepared a permalloy thin plate with an average plate thickness of 25 μm and constitution of $Fe_{78}Ni_{22}$ (atomic ratio). Thermal treatment was performed on this permalloy thin plate in a hydrogen atmosphere. The thermal treatment condition was two-stage thermal treatment of 1200° C.×30 minutes→slow cooling by 100° C./h→600° C.×60 minutes→slow cooling by 100° C./h. The two-stage thermal treatment is for improving the relative permeability. A power receiving device was made similarly to the example 1 except using such a permalloy thin plate. A mobile phone using this power receiving device and the non-contact charging system were designated as example 18.

EXAMPLES 19 AND 20

As magnetic foils, there were prepared Fe-based microcrystal alloy thin ribbons having composition of $Fe_{74}Cu_1Ni_1Mn_1Si_{15}B_8$ (atomic ratio). In the Fe-based microcrystal alloy thin ribbons, 95% of the metallic structure (area ratio) is constituted of microcrystal grains with a grain diameter of 40 nm or smaller. Power receiving devices were made similarly to the example 1 except that such Fe-based microcrystal alloy thin ribbons are used as a single layer or used by stacking three of them. Mobile phones using these power receiving devices and non-contact charging systems were designated as examples 19 and 20.

EXAMPLE 21

As a magnetic foil, there was prepared a silicon steel plate containing Si of 3 mass % and with the remaining portion being substantially constituted of Fe. The average plate thickness of the silicon steel plate is 200 μm. A power receiving device was made similarly to the example 1 except using such a silicon steel plate. A mobile phone using this power receiving device and the non-contact charging system were designated as example 21.

COMPARATIVE EXAMPLE 2

As a magnetic foil, there was prepared a permalloy thin plate with an average plate thickness of 25 μm and constitution of $Fe_{78}Ni_{22}$ (atomic ratio). Thermal treatment was performed on the permalloy thin plate in a hydrogen atmosphere. The thermal treatment condition was 1200° C.×30 minutes. A power receiving device was made similarly to the example 1 except using this permalloy thin plate. A mobile phone using this power receiving device and the non-contact charging system were designated as comparative example 2.

COMPARATIVE EXAMPLE 3

Sendust powder with an average particle diameter of 50 μm was dispersed in resin, and the resin was shaped in a sheet form with a thickness of 250 μm. A power receiving device was made similarly to the example 1 except using this magnetic sheet. A mobile phone using this power receiving device and the non-contact charging system were designated as comparative example 3.

COMPARATIVE EXAMPLE 4

A thin film with constitution of $CO_{65}Zr_{19}Nb_{16}$ (atomic ratio) was formed on a resin film by sputtering method, so as to form a magnetic sheet. A power receiving device was made similarly to the example 1 except using this magnetic sheet. A mobile phone using this power receiving device and the non-contact charging system were designated as comparative example 4.

The μr'·t values for the above-described examples 1 to 21 and comparative examples 1 to 4 are as shown in Table 2. Coupling efficiencies and heating values of the non-contact charging systems of the respective examples were measured and evaluated. Evaluation results are shown in Table 2. The coupling efficiencies were evaluated by how much power can be transmitted to the secondary coil (power receiving coil) when constant power (here 1 W) is transmitted from the primary coil (power feeding coil). When the coupling efficiency of the comparative example 1 (power amount transmitted to the secondary coil) is 100, one with improvement of 20% or more (120 or more and less than 140) is shown by ○, one with improvement of 40% or more (140 or more) is shown by ◎, and one with improvement of less than 20% (less than 120) is shown by X.

Regarding the heat values, power transmission was performed at a transmission rate of 0.4 W/h and at a transmission rate of 1.5 w/h for two hours respectively, and temperature increases after two hours were measured. One with a temperature increase of 25° C. or lower is shown by ◎, and one with a temperature increase higher than 25° C. and equal to or lower than 40° C. is shown by ○, and one with a temperature increase higher than 40° C. is shown by Δ. The temperature before transmission is unified at a room temperature (25° C.). The power receiving rate is 0.25 W/h when the transmission rate is 0.4 W/h, and 0.9 W/h when the transmission rate is 1.5 W/h.

TABLE 2

| | MAGNETIC FOIL | EVALUATION RESULT | | |
|---|---|---|---|---|
| | | | HEATING (TRANSMISSION RATE*) | |
| | $\mu r' \cdot t$ [μM] | COUPLING | 0.4 W/h | 1.5 W/h |
| EXAMPLE 1 | 90000 | ◎ | Δ | Δ |
| EXAMPLE 2 | 108000 | ◎ | Δ | Δ |
| EXAMPLE 3 | 342000 | ◎ | Δ | Δ |
| EXAMPLE 4 | 171000 | ◎ | Δ | Δ |
| EXAMPLE 5 | 513000 | ◎ | ○ | Δ |
| EXAMPLE 6 | 85000 | ○ | Δ | Δ |
| EXAMPLE 7 | 255000 | ◎ | Δ | Δ |
| EXAMPLE 8 | 277500 | ◎ | ◎ | ◎ |
| EXAMPLE 9 | 185000 | ◎ | ○ | Δ |
| EXAMPLE 10 | 30000 | ○ | Δ | Δ |
| EXAMPLE 11 | 120000 | ◎ | ◎ | Δ |
| EXAMPLE 12 | 144000 | ◎ | ◎ | ○ |
| EXAMPLE 13 | 192000 | ◎ | ◎ | ◎ |
| EXAMPLE 14 | 288000 | ◎ | ◎ | ◎ |
| EXAMPLE 15 | 100000 | ○ | Δ | Δ |
| EXAMPLE 16 | 137500 | ◎ | Δ | Δ |

TABLE 1

| | MAGNETIC FOIL | | | | | |
|---|---|---|---|---|---|---|
| | CONSTITUTION | THERMAL TREATMENT | $\mu r'$ | Ms [T] | PLATE THICKNESS [μm] | NUMBER OF STACKS |
| EXAMPLE 1 | $Co_{70}Fe_5Si_5B_{20}$ | NONE | 5000 | 0.55 | 18 | 1 |
| EXAMPLE 2 | $Co_{70}Fe_5Si_5B_{20}$ | 200° C. × 30 MIN | 6000 | 0.55 | 18 | 1 |
| EXAMPLE 3 | $Co_{70}Fe_5Si_5B_{20}$ | 440° C. × 30 MIN | 19000 | 0.55 | 18 | 1 |
| EXAMPLE 4 | $Co_{70}Fe_5Si_5B_{20}$ | 440° C. × 30 MIN | 18000 | 0.55 | 9.5 | 1 |
| EXAMPLE 5 | $Co_{70}Fe_5Si_5B_{20}$ | 440° C. × 30 MIN | 18000 | 0.55 | 9.5 | 3 |
| EXAMPLE 6 | $Co_{70}Fe_5Si_5B_{20}$ | 440° C. × 30 MIN | 17000 | 0.55 | 5 | 1 |
| EXAMPLE 7 | $Co_{70}Fe_5Si_5B_{20}$ | 440° C. × 30 MIN | 17000 | 0.55 | 5 | 3 |
| EXAMPLE 8 | $Co_{70}Fe_5Si_5B_{20}$ | NONE | 5000 | 0.55 | 18.5 | 3 |
| EXAMPLE 9 | $Co_{70}Fe_5Si_5B_{20}$ | NONE | 5000 | 0.55 | 18.5 | 2 |
| EXAMPLE 10 | $Co_{70}Fe_5Si_5B_{20}$ | 200° C. × 30 MIN | 6000 | 0.55 | 5 | 1 |
| EXAMPLE 11 | $Fe_{78}B_{14}Si_8$ | NONE | 5000 | 1.44 | 24 | 1 |
| EXAMPLE 12 | $Fe_{78}B_{14}Si_8$ | 200° C. × 30 MIN | 6000 | 1.44 | 24 | 1 |
| EXAMPLE 13 | $Fe_{78}B_{14}Si_8$ | 440° C. × 30 MIN | 8000 | 1.44 | 24 | 1 |
| EXAMPLE 14 | $Fe_{78}B_{14}Si_8$ | NONE | 4000 | 1.44 | 24 | 3 |
| EXAMPLE 15 | $Co_{76}Fe_4Ni_3Si_6B_{11}$ | NONE | 4000 | 0.55 | 25 | 1 |
| EXAMPLE 16 | $Co_{76}Fe_4Ni_3Si_6B_{11}$ | 200° C. × 30 MIN | 5500 | 0.55 | 25 | 1 |
| EXAMPLE 17 | $Co_{76}Fe_4Ni_3Si_6B_{11}$ | 440° C. × 30 MIN | 7000 | 0.55 | 25 | 1 |
| EXAMPLE 18 | PERMALLOY | 1200° C. × 30 MIN → 600° C. × 60 MIN | 8000 | 0.87 | 25 | 3 |
| EXAMPLE 19 | Fe-BASED MICROCRYSTAL ALLOY | NONE | 20000 | 1.36 | 22 | 1 |
| EXAMPLE 20 | Fe-BASED MICROCRYSTAL ALLOY | NONE | 20000 | 1.36 | 22 | 3 |
| EXAMPLE 21 | SILICON STEEL PLATE | NONE | 300 | 2 | 200 | 1 |
| COMPARATIVE EXAMPLE 1 | NONE | — | 1 | 0 | — | 0 |
| COMPARATIVE EXAMPLE 2 | PERMALLOY | 1200° C. × 30 MIN | 1000 | 0.87 | 25 | 1 |
| COMPARATIVE EXAMPLE 3 | (SENDUST POWDER) | NONE | 80 | 0.55 | 250 | 1 |
| COMPARATIVE EXAMPLE 4 | (SPUTTER FILM) | NONE | 3300 | 2 | 6 | 1 |

TABLE 2-continued

| | MAGNETIC FOIL | EVALUATION RESULT | | |
|---|---|---|---|---|
| | | | HEATING (TRANSMISSION RATE*) | |
| | μr'·t [μM] | COUPLING | 0.4 W/h | 1.5 W/h |
| EXAMPLE 17 | 175000 | ⊚ | Δ | Δ |
| EXAMPLE 18 | 600000 | ⊚ | ⊚ | ⊚ |
| EXAMPLE 19 | 440000 | ⊚ | ⊚ | ⊚ |
| EXAMPLE 20 | 1320000 | ⊚ | ⊚ | ⊚ |
| EXAMPLE 21 | 60000 | ○ | ⊚ | ⊚ |
| COMPARATIVE EXAMPLE 1 | 0 | X | Δ | Δ |
| COMPARATIVE EXAMPLE 2 | 25000 | X | Δ | Δ |
| COMPARATIVE EXAMPLE 3 | 20000 | X | Δ | Δ |
| COMPARATIVE EXAMPLE 4 | 19800 | X | Δ | Δ |

*POWER RECEIVING RATE IS 0.25 W/h WHEN TRANSMISSION RATE IS 0.4 W/h, 0.9 W/h WHEN TRANSMISSION RATE IS 1.5 W/h

As is clear from Table 2, using a magnetic foil with μr'·t value of 30000 or higher, the coupling efficiency (power receiving efficiency) can be improved. For these examples, charging was completed mostly by charging of two hours. Further, a state of being charged for two or more hours was kept for five hours, but the temperature did not increase so much. This means that the temperature increase is saturated when being overcharged. Regarding the temperature increase (heating value), it can be seen that charging (charging rate) for satisfying the battery capacity is important. On the other hand, the heating values were large in the comparative examples. In such cases, problems occur unless charging is performed for a long period of time with a small transmitted power amount.

EXAMPLE 22

In the magnetic foil (stack of three amorphous alloy thin ribbons) of the example 8, a bending portion was formed by bending the protruding portion (do=3 mm) on the outer peripheral side. A power receiving device was made similarly to the example 1 except using such a magnetic foil. Characteristics of this power receiving device were measured and evaluated similarly to the example 1. Results thereof are shown in Table 3.

EXAMPLE 23

In the magnetic foil of the example 8, an opening in a projecting shape (refer to FIG. 7) was formed in a position corresponding to the center portion of the spiral coil. A power receiving device was made similarly to the example 1 except using such a magnetic foil. Characteristics of this power receiving device were measured and evaluated similarly to the example 1. Results thereof are shown in Table 3.

EXAMPLE 24

In the magnetic foil of the example 8, an opening (refer to FIG. 8) was formed in a position corresponding to the center portion of the spiral coil. A power receiving device was made similarly to the example 1 except using such a magnetic foil. Characteristics of this power receiving device were measured and evaluated similarly to the example 1. Results thereof are shown in Table 3.

EXAMPLE 25

In the magnetic foil of the example 24, it was set di=0 mm. A power receiving device was made similarly to the example 1 except using such a magnetic foil. Characteristics of this power receiving device were measured and evaluated similarly to the example 1. Results thereof are shown in Table 3.

EXAMPLE 26

In the magnetic foil of the example 24, it was set di=−3 mm. A power receiving device was made similarly to the example 1 except using such a magnetic foil. Characteristics of this power receiving device were measured and evaluated similarly to the example 1. Results thereof are shown in Table 3.

EXAMPLE 27

In the magnetic foil of the example 24, it was set d=3 mm. The projecting portion with di of 3 mm was bent as shown in FIG. 9. A power receiving device was made similarly to the example 1 except using such a magnetic foil. Characteristics of this power receiving device were measured and evaluated similarly to the example 1. Results thereof are shown in Table 3.

EXAMPLE 28

In the magnetic foil of the example 8, there were formed one slit vertically and one slit horizontally (refer to FIG. 10). The width of a slit was set to 100 μm. A power receiving device was made similarly to the example 1 except using such a magnetic foil. Characteristics of this power receiving device were measured and evaluated similarly to the example 1. Results thereof are shown in Table 3.

EXAMPLE 29

In the magnetic foil of the example 8, a plurality of slits were formed in each of a vertical direction and a horizontal direction (refer to FIG. 11). The slits were given cycles (formation pitches) that become smaller toward the center. The widths of slits were in the range of 50 μm to 1000 μm. A power receiving device was made similarly to the example 1 except using such a magnetic foil. Characteristics of this power receiving device were measured and evaluated similarly to the example 1. Results thereof are shown in Table 3.

EXAMPLE 30

In the magnetic foil of the example 8, a plurality of slits were formed radially (refer to FIG. 12). A power receiving device was made similarly to the example 1 except using such a magnetic foil. Characteristics of this power receiving device were measured and evaluated similarly to the example 1. Results thereof are shown in Table 3.

EXAMPLE 31

In the magnetic foil of the example 8, a plurality of slits were formed from end portions of the foil body to a middle portion (refer to FIG. 13). A power receiving device was made similarly to the example 1 except using such a magnetic foil. Characteristics of this power receiving device were measured and evaluated similarly to the example 1. Results thereof are shown in Table 3.

EXAMPLE 32

In the magnetic foil of the example 8, there were formed both of a plurality of slits from end portions of the foil to a middle portion and a plurality of independent slits (refer to FIG. 14). A power receiving device was made similarly to the example 1 except using such a magnetic foil. Characteristics of this power receiving device were measured and evaluated similarly to the example 1. Results thereof are shown in Table 3.

EXAMPLE 33

In the magnetic foil of the example 8, among the three amorphous alloy thin ribbons, two were kept the same, and one was bent at its outer peripheral portion to form a bending portion (refer to FIG. 15). A power receiving device was made similarly to the example 1 except using such a magnetic foil. Characteristics of this power receiving device were measured and evaluated similarly to the example 1. Results thereof are shown in Table 3.

EXAMPLE 34

As shown in FIG. 3, the spiral coil was arranged around the secondary battery. Further, a magnetic foil having the same constitution as the example 8 was bent and arranged so as to exist between the spiral coil and the circuit board and between the spiral coil and the secondary battery. A power receiving device was made similarly to the example 1 except using such a structure. Characteristics of this power receiving device were measured and evaluated similarly to the example 1. Results thereof are shown in Table 3.

EXAMPLE 35

In the magnetic foil of the example 3, a plurality of slits were formed so that a shape of the magnetic foil after being divided becomes 1 mm×1 mm. A power receiving device was made similarly to the example 1 except using such a magnetic foil. Characteristics of this power receiving device were measured and evaluated similarly to the example 1. Results thereof are shown in Table 3.

TABLE 3

| | MAGNETIC FOIL | | COUPLING | HEATING (TRANSMISSION RATE*) | |
|---|---|---|---|---|---|
| | CONSTITUTION | SHAPE | | 0.4 W/h | 1.5 W/h |
| EXAMPLE 22 | SAME AS EXAMPLE 8 | BENDING PORTION | ◎ | ◎ | ◎ |
| EXAMPLE 23 | SAME AS EXAMPLE 8 | PROJECTING OPENING | ◎ | Δ | Δ |
| EXAMPLE 24 | SAME AS EXAMPLE 8 | OPENING | ◎ | Δ | Δ |
| EXAMPLE 25 | SAME AS EXAMPLE 8 | di = 0 mm | ◎ | Δ | Δ |
| EXAMPLE 26 | SAME AS EXAMPLE 8 | di = −3 mm | ○ | Δ | Δ |
| EXAMPLE 27 | SAME AS EXAMPLE 8 | di = 3 mm + BENDING | ◎ | Δ | Δ |
| EXAMPLE 28 | SAME AS EXAMPLE 8 | SLIT | ○ | ◎ | ○ |
| EXAMPLE 29 | SAME AS EXAMPLE 8 | SLIT | ○ | ◎ | ○ |
| EXAMPLE 30 | SAME AS EXAMPLE 8 | SLIT | ○ | ◎ | ○ |
| EXAMPLE 31 | SAME AS EXAMPLE 8 | SLIT | ○ | ◎ | ○ |
| EXAMPLE 32 | SAME AS EXAMPLE 8 | SLIT | ◎ | ◎ | ◎ |
| EXAMPLE 33 | SAME AS EXAMPLE 8 | ONE IS BENT | ◎ | ◎ | ◎ |
| EXAMPLE 34 | SAME AS EXAMPLE 8 | (COIL SHAPE CHANGE) | ◎ | ◎ | ◎ |
| EXAMPLE 35 | SAME AS EXAMPLE 3 | SLIT | ○ | ◎ | ◎ |

*POWER RECEIVING RATE IS 0.25 W/h WHEN TRANSMISSION RATE IS 0.4 W/h, 0.9 W/h WHEN TRANSMISSION RATE IS 1.5 W/h

As is clear from Table 3, various types of shapes can be applied to the magnetic foils. Using such shapes of magnetic foils appropriately, further effects can be obtained.

EXAMPLE 36, COMPARATIVE EXAMPLE 5

As shown in Table 4, magnetic foils (permalloy) with different $R \cdot \mu_r'$ values were prepared. Power receiving devices were made similarly to the example 1 except using these magnetic foils. Characteristics of this power receiving device were measured and evaluated similarly to the example 1. Results thereof are shown in Table 4 together. From Table 4, it can be seen that it is preferable to have the value $R \cdot \mu_r'$ of $1.01 \times 10^{-3}$ or higher.

TABLE 4

| | MAGNETIC FOIL | | | COUPLING | HEATING (TRANSMISSION RATE*) | |
|---|---|---|---|---|---|---|
| | CONSTITUTION | R [Ωm] | $R \cdot \mu_r'$ | | 0.4 W/h | 1.5 W/h |
| EXAMPLE 36 | PERMALLOY | $1.6 \times 10^{-7}$ | $1.3 \times 10^{-3}$ | ◎ | ◎ | ◎ |
| COMPARATIVE EXAMPLE 5 | PERMALLOY | $1.6 \times 10^{-7}$ | $1.6 \times 10^{-4}$ | X | Δ | Δ |

*POWER RECEIVING RATE IS 0.25 W/h WHEN TRANSMISSION RATE IS 0.4 W/h, 0.9 W/h WHEN TRANSMISSION RATE IS 1.5 W/h

It should be noted that the present invention is not limited to the above embodiments. Various modifications can be made without departing from the spirit of the invention in the implementation phase. Further, the embodiments can be implemented in an appropriately combined manner in the possible range thereof, and in this case combined effects can be obtained. Furthermore, several phases of inventions are included in the above embodiments, and several inventions can be extracted by an appropriate combination of a plurality of components which are disclosed.

Industrial Applicability

In a power receiving device and an electronic apparatus according to an aspect of the invention, a magnetic foil is arranged in one or more positions between a spiral coil and a secondary battery, a rectifier, an electronic device, a circuit board, and/or the like, thereby suppressing generation of an overcurrent due to electromagnetic induction. Therefore, it becomes possible to suppress heating, generation of noise, decrease in power receiving efficiency, and the like due to the overcurrent. Such a power receiving device and an electronic apparatus are used effectively for various types of electronic apparatuses in which non-contact charging is applied.

What is claimed is:

1. A power receiving device, comprising:
   a power receiving coil having a spiral coil;
   a rectifier rectifying an alternating voltage generated in the power receiving coil;
   a secondary battery to which a direct current voltage rectified in the rectifier is charged; and
   a magnetic foil arranged in at least one of a position between the spiral coil and the secondary battery, and a position between the spiral coil and the rectifier,
   wherein the magnetic foil comprises a body of a plurality of stacked magnetic alloy ribbons comprising an amorphous alloy or an iron-based microcrystal alloy, and each magnetic alloy ribbon has an average thickness in a range of 5 to 25 μm,
   wherein the magnetic foil has a $\mu r' \cdot t$ value in a range of 30000 or more and 1320000 or less, where the $\mu r'$ is a real component of relative permeability of the magnetic foil, t [μm] is a plate thickness of the magnetic foil which is a total thickness of the plurality of the stacked magnetic alloy ribbons, and the $\mu r' \cdot t$ value is a product of the real component $\mu r'$ of the relative permeability and the plate thickness t, and
   wherein a power receiving rate of the power receiving coil is 0.25 W/h or higher.

2. The power receiving device according to claim 1, wherein the magnetic foil has the $\mu r' \cdot t$ value in a range of 40000 or more and 1320000 or less.

3. The power receiving device according to claim 2, wherein the magnetic foil has a $R \cdot \mu r'$ value of $1.01 \times 10^{-3}$ or more, where R [Ω·m] is an electric resistivity of the magnetic foil and the $R \cdot \mu r'$ value is a product of the electric resistivity R and the real component $\mu r'$ of the relative permeability.

4. The power receiving device according to claim 1, wherein an outer peripheral end portion of the magnetic foil extends outward farther than an outer peripheral portion of the spiral coil.

5. The power receiving device according to claim 1, wherein the magnetic foil has a slit.

6. The power receiving device according to claim 1, wherein the magnetic foil is divided into a plurality of pieces.

7. The power receiving device according to claim 1, wherein the secondary battery is a lithium ion secondary battery.

8. An electronic apparatus, comprising:
   a power receiving device including a power receiving coil having a spiral coil, a rectifier rectifying an alternating voltage generated in the power receiving coil, and a secondary battery to which a direct current voltage rectified in the rectifier is charged;
   an electronic apparatus main body including an electronic device supplied with the direct current voltage from the secondary battery for operation, and a circuit board on which the electronic device is mounted; and
   a magnetic foil arranged in at least one of a position between the spiral coil and the secondary battery, a position between the spiral coil and the rectifier, a position between the spiral coil and the electronic device, and a position between the spiral coil and the circuit board,
   wherein the magnetic foil comprises a body of a plurality of stacked magnetic alloy ribbons comprising an amorphous alloy or an iron-based microcrystal alloy, and each magnetic alloy ribbon has an average thickness in a range of 5 to 25 μm,
   wherein the magnetic foil has a $\mu r' \cdot t$ value in a range of 30000 or more and 1320000 or less, where the $\mu r'$ is a real component of relative permeability of the magnetic foil, t [μm] is a plate thickness of the magnetic foil which is a total thickness of the plurality of the stacked magnetic alloy ribbons, and the $\mu r' \cdot t$ value is a product of the real component $\mu r'$ of the relative permeability and the plate thickness t, and
   wherein a power receiving rate of the power receiving coil is 0.25 W/h or higher.

9. The electronic apparatus according to claim 8, wherein the magnetic foil has the $\mu r' \cdot t$ value in a range of 40000 or more and 1320000 or less.

10. The electronic apparatus according to claim 9, wherein the magnetic foil has a $R \cdot \mu r'$ value of $1.01 \times 10^{-3}$ or more, where R [Ω·m] is an electric resistivity of the magnetic foil and the $R \cdot \mu r'$ value is a product of the electric resistivity R and the real component $\mu r'$ of the relative permeability.

11. The electronic apparatus according to claim 8, wherein the spiral coil is arranged around the secondary battery, and the magnetic foil is arranged between the spiral coil and the circuit board.

12. The electronic apparatus according to claim 8, wherein the magnetic foil has a bending portion which is an outer peripheral end portion bent in a direction opposite to the circuit board.

13. The electronic apparatus according to claim 8, wherein an outer peripheral end portion of the magnetic foil extends outward farther than an outer peripheral portion of the spiral coil.

14. The electronic apparatus according to claim 8, wherein the secondary battery is a lithium ion secondary battery.

15. A non-contact charging system, comprising:
   the electronic apparatus according to claim 8; and
   a power feeding device including a power feeding coil arranged in a non-contact manner with the power receiving coil of the electronic apparatus and a power supply applying an alternating voltage to the power feeding coil,
   wherein magnetic flux generated in the power feeding coil is transmitted to the power receiving coil to transmit power in a non-contact manner.

16. The power receiving device according to claim 1, wherein the magnetic foil has the real component $\mu r'$ of the relative permeability in a range of 5000 to 20000.

17. The electronic apparatus according to claim 8, wherein the magnetic foil has the real component $\mu r'$ of the relative permeability in a range of 5000 to 20000.

* * * * *